(12) United States Patent
Sachdev et al.

(10) Patent No.: US 9,096,035 B2
(45) Date of Patent: Aug. 4, 2015

(54) CORROSION RESISTANT MAGNESIUM ARTICLE METHOD OF MAKING

(75) Inventors: Anil K. Sachdev, Rochester Hills, MI (US); Jon T. Carter, Farmington, MI (US); Blair E. Carlson, Ann Arbor, MI (US); Guangling Song, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 956 days.

(21) Appl. No.: 13/241,815

(22) Filed: Sep. 23, 2011

(65) Prior Publication Data

US 2013/0078480 A1 Mar. 28, 2013

(51) Int. Cl.
| | |
|---|---|
| *B23P 25/00* | (2006.01) |
| *B32B 15/01* | (2006.01) |
| *C23C 24/04* | (2006.01) |
| *C22C 21/00* | (2006.01) |
| *C22C 23/00* | (2006.01) |
| *C22C 23/02* | (2006.01) |

(52) U.S. Cl.
CPC ............... *B32B 15/017* (2013.01); *C22C 21/00* (2013.01); *C22C 23/00* (2013.01); *C22C 23/02* (2013.01); *C23C 24/04* (2013.01); *Y10T 29/49986* (2015.01); *Y10T 428/12063* (2015.01)

(58) Field of Classification Search
CPC ..................... Y10T 29/4988; Y10T 29/49885; Y10T 29/49886; Y10T 29/49882; Y10T 29/49982; Y10T 29/49986; F16C 33/12; C23C 24/04; C23C 30/005; C23C 30/00; C23C 4/18; C23C 4/08; C23C 4/0005
See application file for complete search history.

(56) References Cited

U.S. PATENT DOCUMENTS

| | | | | | |
|---|---|---|---|---|---|
| 2,187,348 | A | * | 1/1940 | Hodson | 29/898.12 |
| 3,631,835 | A | * | 1/1972 | Hamontre et al. | 118/47 |
| 3,711,310 | A | * | 1/1973 | Leeper, Jr. | 427/452 |
| 4,105,816 | A | * | 8/1978 | Hori | 428/159 |
| 5,028,457 | A | * | 7/1991 | Kinose et al. | 427/258 |
| 6,095,126 | A | * | 8/2000 | Kloft et al. | 123/668 |

FOREIGN PATENT DOCUMENTS

| | | |
|---|---|---|
| DE | 102009056672 A1 | 6/2010 |
| DE | 102009011248 A1 | 9/2010 |
| DE | 102009020674 A1 | 11/2010 |

OTHER PUBLICATIONS

Bu, Heng Yong et al.; Heat Treatment of Cold Spray Aluminum Coating on Magnesium Substrates; Metallic Functional Materials; China Academic Journal Electronic Publishing House; vol. 18, No. 4; Aug. 2011; pp. 26-31.

* cited by examiner

*Primary Examiner* — Jermie Cozart
(74) *Attorney, Agent, or Firm* — Reising Ethington P.C.

(57) ABSTRACT

The corrosion resistance of formed and shaped sheet magnesium alloy articles may be improved by applying to the article a substantially crack- and pore-free ductile metal layer on at least selected surfaces and cut or sheared edges. An exemplary ductile metal may be aluminum or its alloys. Two methods of applying such a ductile metal layer are described. One method is suitable for extended areas of the magnesium alloy surface, and is applied prior to stamping the article while a second method, suitable for cut or sheared edges, is intended for application after the article is fully formed. The incorporation of both embodiments into conventional sheet metal stamping processes to form the corrosion resistant formed magnesium article is described.

17 Claims, 5 Drawing Sheets

CORROSION RESISTANT MAGNESIUM ARTICLE METHOD OF MAKING

TECHNICAL FIELD

This invention relates to methods for enhancing the corrosion resistance of magnesium alloy articles, and particularly magnesium alloy sheets and stamped articles, by application of a corrosion-resistant ductile metal coating on at least the surface of the article, and for sheets and stamped articles, also on the edge of the article. The ductile metal coating is mechanically worked to render it smooth and substantially crack- and pore-free so that it may serve as an effective barrier coating and prevent access of electrolyte to the magnesium article.

BACKGROUND OF THE INVENTION

Magnesium-based alloys containing more than 85% by weight of magnesium may be formed into useful shaped articles for automotive applications. The low density of such formed magnesium articles offers opportunity for vehicle mass reduction and significant improvement in vehicle fuel economy. However, Mg alloys exhibit poor corrosion resistance, both to general corrosion and to galvanic corrosion when in contact with a dissimilar metal. Such poor resistance to corrosion, particularly to galvanic corrosion, significantly limits their wider application, for example as stamped components in automobile bodies which commonly incorporate steel and aluminum.

In many instances, the corrosion resistance of an article may be enhanced by application of one or more barrier coatings, intended to exclude the corrosive environment from contact with the article and so better ensure product longevity in corrosive environments. In auto body manufacture such coatings, which may include paints and other organic coatings, are often applied to an assembled automobile body. In principle such an approach is applicable to magnesium alloys also, but magnesium alloys are not particularly compatible with many commonly-used automobile body coating processes.

What is therefore needed is an efficient and easily-operated technique to modify the surface composition of magnesium alloy components in particular to render such components more corrosion-resistant.

SUMMARY OF THE INVENTION

In the manufacture of stamped sheet metal articles, a sheet or blank of predetermined dimensions, cut from a continuous length of sheet and larger than the size of the intended stamped article, is processed into a stamped sheet metal article by a sequence of operations. The blank is first 'drawn' or formed or shaped between forming dies in a forming press to obtain the shape of the finished article. Because only a portion of the blank area is shaped, the excess sheet metal is trimmed from the oversize part, commonly by shearing using cutting or trim dies mounted in another press. Often the article will be subject to additional operations such as bending to form a flange, or punching to introduce one or more holes or openings, each operation performed in yet additional presses, and each with a die set appropriate to the operation at hand.

If corrosion of the stamped article is a concern, a protective continuous barrier layer coating may be applied to the blank surfaces to deny an electrolyte access to the article. Of course, for persistent protection over the life of the article, any such coating must itself be substantially non-corrodible in the anticipated corrosive environments. But such a surface coating will not be effective in protecting against corrosion at the cut or sheared edges created when the excess sheet metal is trimmed away from the shaped blank. Also, cold worked edges, like those created by shearing often corrode more extensively than sheet surfaces, exacerbating the lack of a coating on the sheared edge. Hence for complete protection of the article against corrosion it may be necessary to first coat the blank surfaces, stamp the article, trim and punch the article, and then coat any exposed edges of the article. The need to stamp the blank, coupled with the need to maintain a continuous barrier layer, limits the choice of barrier layer materials to materials which will exhibit a tensile elongation at least as great as the article material and those which will not flake off or abrade when deformed in contact with the die surface.

Stamping of many metals, notably aluminum alloys and steels is conducted at ambient or room temperature, between about 20° C. and 30° C. It is known that the ductility of most metals increases with an increase in temperature and so for more complex, highly strained sheet metal articles, warm forming or stamping may be practiced. Warm forming may be performed at temperatures of between 200° C. and 400° C., the specific temperature being selected depending on the composition and microstructure of the sheet and the complexity of the article. Magnesium has only limited ductility at ambient temperature and so even moderately-strained magnesium articles may need to be warm formed. This imposes a further requirement in the selection of a suitable barrier coating.

Magnesium, and magnesium-based alloys containing 85% or more by weight of magnesium, are the most corrodible of the structural metals and are most often protected by application of barrier coatings. Only a limited number of types of barrier coatings satisfy the requirements of being themselves corrosion-resistant, durable under typical stamping practices, being at least as ductile as magnesium and compatible with warm forming practice. A suitable candidate is metallic aluminum, generally unalloyed aluminum, although selected aluminum alloys may be acceptable. Unalloyed aluminum is aluminum metal to which alloying elements have not been intentionally added but which, in common with aluminum alloys, may contain impurities. Exemplary representative compositions may be classified as Aluminum Association 1000 series alloys and contain at least 99% aluminum. Preferably impurity levels, particularly of copper and iron are maintained as low as possible. Zinc-based coatings may also be used. In addition to their benefits to corrosion performance, such electrically conductive coatings beneficially provide an electrically conductive path between contacting components which may be required in some body painting processes.

In an embodiment a coating may be applied by cold-spray coating, a process which is well-suited to application of ductile metals, like aluminum and its alloys. Cold spray coating employs compressed heated gas, at a pressure of between 2.5 and 4.5 MPa to propel a jet of dry, fine, 5 to 200 micrometer powder particles at very high velocities (500-1500 m/s) from a nozzle and against a substrate which may be located between 6 millimeters and 25 millimeters from the nozzle. On impact with the substrate and/or previously-deposited particles, the particles will deform under high strain rate and spread laterally to adopt a more flattened aspect, so that the initial particle size cannot be simply related to the thickness of the deposited layer. Although air may be used as the propellant gas it is preferred to use an inert gas to suppress oxidation, and helium, nitrogen and helium-nitrogen mixtures are commonly used. The width of the deposit, depending on nozzle design, may be between 2 and 12 millimeters. The powder particles are only moderately heated. On impact with a substrate they deform and bond to themselves and the magnesium substrate to form a porous, rough, sometimes cracked, solid-state coating. The particles remain solid during the coating process and are relatively cold and so the substrate temperature remains low, only briefly exceeding 200° C. so that it undergoes little or no metallurgical change during the coating process. With an inert propellant gas, little particle oxidation occurs and a substantially oxide-free deposit will result. By moving the substrate relative to the nozzle, the substrate may be coated over its entire surface or over only a portion of its surface. Traverse rates of up to 100 millimeters per second may be employed. This capability may be used to advantage if magnesium is to be attached to a dissimilar metal, which may lead to galvanic corrosion. By selectively coating and working only those portions of the magnesium sheet which may contact the other metal any galvanic corrosion may be minimized without excessive processing. For general corrosion it may be appropriate to coat the entire surface.

The as-sprayed layer is typically rough and porous and suitably averages at least 40 micrometers in thickness. The layer may be applied to any desired thickness, but generally a maximum coating thickness of about 400 micrometers provides satisfactory corrosion performance and further increase in the thickness of the coating layer offers only minimal additional improvement in corrosion performance. A typical spray-applied coating may suitably be at least several powder particles thick, although a more uniform coverage may be obtained by reducing the particle size to accommodate a greater number of particles in the desired coating thickness. The as-sprayed layer may be worked to form a smooth, substantially pore-free layer of generally uniform thickness using a rotating durable tool. The tool, fabricated, for example, of tool steel, may be applied, under pressure, to the sheet surface and traversed across the surface, generating frictional heating as it does so. Depending on the process conditions only the coating may be deformed but under some process conditions the combination of the frictional heating and the stirring action of the tool may promote mechanical mixing of the magnesium alloy substrate and the aluminum-based coating. This mixing is generally desirable in further enhancing the mechanical interlock between substrate and coating provided only modest dilution or alloying of the aluminum by magnesium occurs. Suitably the coating should contain no more than about 20% by weight of magnesium if it is to maintain its effectiveness in suppressing corrosion.

The tool may have the form of a solid cylinder of about 50 millimeters in diameter or less and rotate about its cylindrical axis with a cylinder end in contact with the substrate so that some frictional heating will occur to render the surface more malleable. By rotating the tool at a rotational speed of say 1000-1500 rpm and traversing the tool at speeds of between 500 and 2000 millimeters per minute under a normal pressure of between 200 and 400 pounds, the coating may be smoothed and rendered substantially pore-free. It may be preferred to render the coating-contacting cylinder end slightly convex and to incline the rotation axis of the tool from the surface normal of the magnesium sheet. The values of operating parameters used in this and subsequent sections are representative of appropriate practice but are intended to be neither limiting nor optimal.

The as-sprayed layer may be smoothed by contact with a durable cylindrical tool rotating about its axis but with the cylindrical surface in contact with the coating. By traversing such a cylindrical tool across the surface of the as-sprayed layer, under pressure, at a speed appreciably less than the surface speed of the cylinder, the as-sprayed layer may be worked and smoothed. Suitably the cylinder traverse speed may be between 5 and 10% of the cylinder surface speed so that the layer will undergo adequate frictional heating to promote forming a smooth and generally pore-free coating. More suitably, the direction of cylinder traverse may be in opposition to the direction of surface rotation of the tool. Suitable operating conditions for a 50 millimeter diameter cylindrical tool, 100 millimeters long, may include an applied pressure of between 100 and 200 pounds, a rotational speed of about 600 rpm and traverse speeds of between 3 and 6 meters per minute.

Of course, with appropriate articulation, this process may also be applied to a cast or otherwise shaped magnesium article which is robust enough to sustain the tool load without damaging or reshaping the article. The article may be supported in a fixture mounted, for example on a robotic arm programmed to present all of the surfaces to be coated to a fixed cold spray nozzle to achieve a suitable coating or the article may be fixedly held and the nozzle articulated. Such a coating may then be smoothed and rendered substantially pore-free as described above by articulating the article in contact with a fixedly oriented tool or by articulating the tool while holding the article in a fixed orientation. If the fixture limits access of the metal spray or the tool, two or more coating steps and/or two smoothing steps may be required with the article being reoriented its fixture between each operation.

In many applications of magnesium sheets in automobile body sub-assemblies, such as closure panel assemblies like doors, hoods, decklids and liftgates, the sheared edges of a sheet are secured by a hem flange, formed by inserting the edge of one sheet between two surfaces of a folded-over second sheet and trapping the first sheet edge in the fold. In this configuration, it may be difficult for protective barrier coatings, such as paint, which are commonly applied to the sub-assembly and the assembled body, to access the sheet edge, leaving it exposed and susceptible to corrosive attack. Also, the edges of a sheared sheet are heavily cold worked and may have a burr, a thin protruding ragged edge. The presence of both such heavy cold work and of a burr may also promote aggressive corrosive attack. Hence it may be important to apply a barrier coating to the magnesium sheet edges after forming and prior to assembly.

A similar procedure to that described for the protection of the sheet faces may be adopted to enhance the corrosion resistance of the edges. That is, deposition of a cold spray aluminum coating followed by working and smoothing of the edge. But a cold spray process adapted for broad coverage and suitable for coating of extensive flat surfaces, may be ill-adapted to the efficient coating of a narrow edge a millimeter or so in width. Considerable overspray may result. If overspray is unacceptable it may be preferred to apply the initial aluminum coating using an alternative and more selective process.

In a second embodiment a consumable aluminum or aluminum alloy cylinder rotating about its cylindrical axis and with its cylindrical surface in contact with the magnesium sheared edge may be traversed around the perimeter of the sheet. By appropriately adjusting the rotational speed and the traverse rate sufficient frictional heat may be generated to cause some of the aluminum to adhere to and be deposited on the magnesium edge. If necessary, supplemental heating of the aluminum may be employed to promote such deposition. Optionally, to achieve more uniform consumption of the aluminum cylinder along its length the cylinder may be periodically advanced and retracted so that the magnesium edge traces out a helical path along the cylinder.

Before applying aluminum using such a tool it may be preferred to first prepare the edges of the sheet using a shaped, rotating hardened tool. Such a tool, applied to the edge under pressure, and advanced slowly around the sheet perimeter so that it rubs against the edge, will work and shape the sheet edges. The tool may be a cutting tool for removal of material or a burnishing tool which will re-shape the edge without removal of material. Such edge preparation may be particularly desirable if an extensive burr is formed since the hardened tool will tend to reshape and possibly break off the burr and consolidate the edge. A squared edge will be effective in enabling maximum contact between the sheet edge and the aluminum cylinder. If a continuous stream of aluminum powder may be dispensed from a hopper or other storage container at the zone of contact of the hardened burnishing tool with the magnesium edge, the rubbing action of the tool may encourage attachment of the aluminum to the sheet edge. Any aluminum applied in this manner may be used to supplement or substitute for aluminum transferred from the aluminum cylinder. The aluminum, once deposited, may be smoothed and worked using a durable tool shaped and adapted to roll over the edges of the sheet as well as smooth the coating.

These embodiments may be combined with common sheet metal forming practices to fabricate a corrosion-resistant magnesium alloy sheet article. A magnesium alloy sheet, coated over at least a portion of one side with a suitable, same aluminum, cold spray applied ductile metal coating worked and smoothed as described, may be placed in a press or other suitable apparatus and formed or stamped into a desired shape.

Such a formed or stamped shape will commonly require removal, by mechanical trimming or shearing, of excess sheet, required for the forming step, to form the intended article. Removal of the excess sheet will create on the article sheared, uncoated edges. These edges may be coated and smoothed as described to form the intended corrosion-resistant magnesium alloy sheet article.

BRIEF DESCRIPTION OF THE DRAWINGS

FIG. 10 also shows a tool for smoothing and working the edge-applied coating.

DESCRIPTION OF PREFERRED EMBODIMENTS

The substitution of low density sheet magnesium alloy components for denser materials offers opportunity for mass reduction automobile bodies, particularly for closure panels such as the hood, decklid and doors. One such approach is the substitution of magnesium sheet alloy AZ31, nominally containing 3 wt. % aluminum and 1 wt. % zinc for the aluminum alloy and steel panels in current use in automobile bodies. But magnesium has low corrosion resistance and when exposed to aqueous electrolytes such as rain or road splash is prone to corrode. In addition to being susceptible to general corrosion, magnesium is susceptible to galvanic corrosion when it is placed in direct contact with a less corrodible metal in a corrosive medium such as aluminum or steel, both common constituents of automobile bodies.

Figure 1:
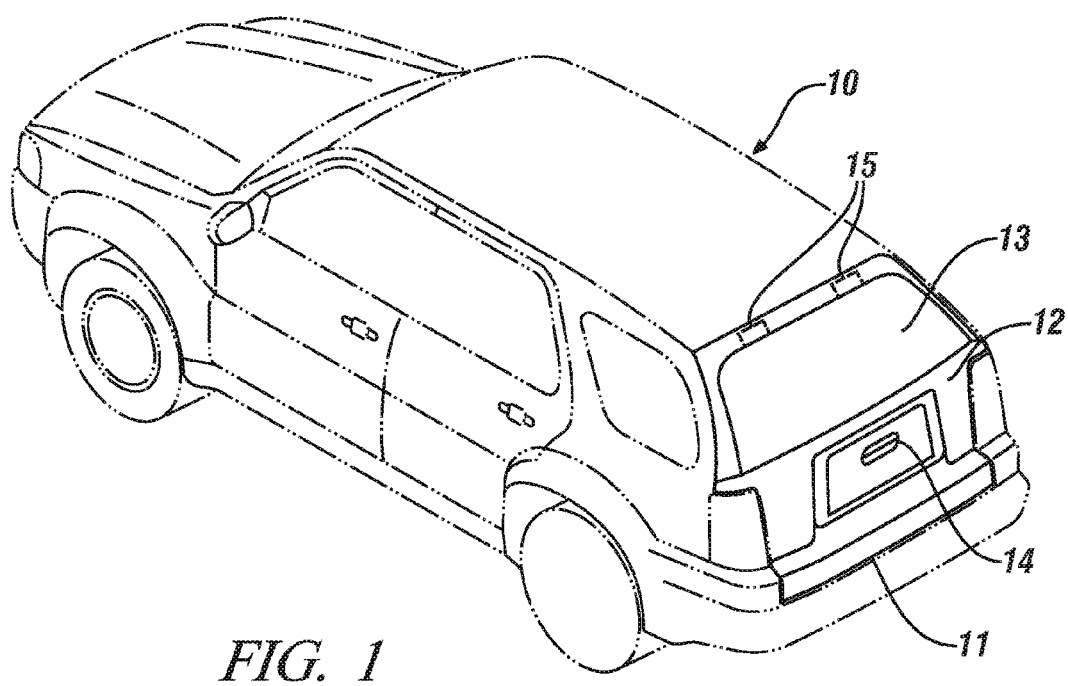
FIG. 1 shows in schematic perspective view a vehicle with a liftgate.

An exemplary sheet metal part which may be fabricated of magnesium and exposed to rain and road splash is the liftgate 12, shown attached to an SUV (Sport Utility Vehicle)-type vehicle 10 in FIG. 1. Liftgate 12 is a two-part assembly, the visible outer panel shown and an inner panel, hidden in this view. The liftgate includes a number of features and details, including the window opening 13, liftgate opening assembly and handle 14, (hidden) hinges 15 and liftgate lower edge 11.

Figure 2:
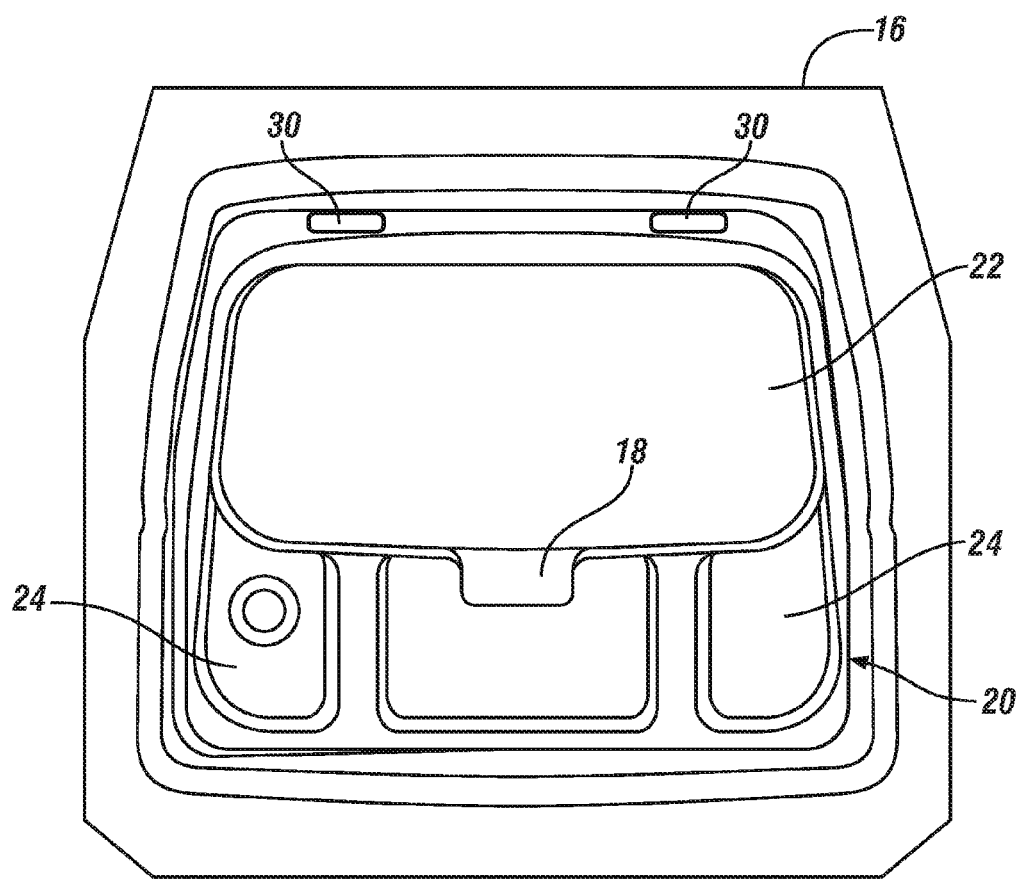
FIG. 2 shows, in plan view, a metal blank which has been formed, in a draw die, to adopt the form of a liftgate inner panel.

FIG. 2 shows, in plan view a shaped blank 16 suitable for forming the (hidden) inner panel of liftgate 12 of FIG. 1, after its removal from the draw or forming die which imparts the intended shape to the initially flat blank. The formed or shaped region 20 of the formed blank includes a number of features including window opening elevation 22, hinge assembly attachment depressions 30, handle assembly mounting flat 18, and depression(s) 24.

Figure 3:
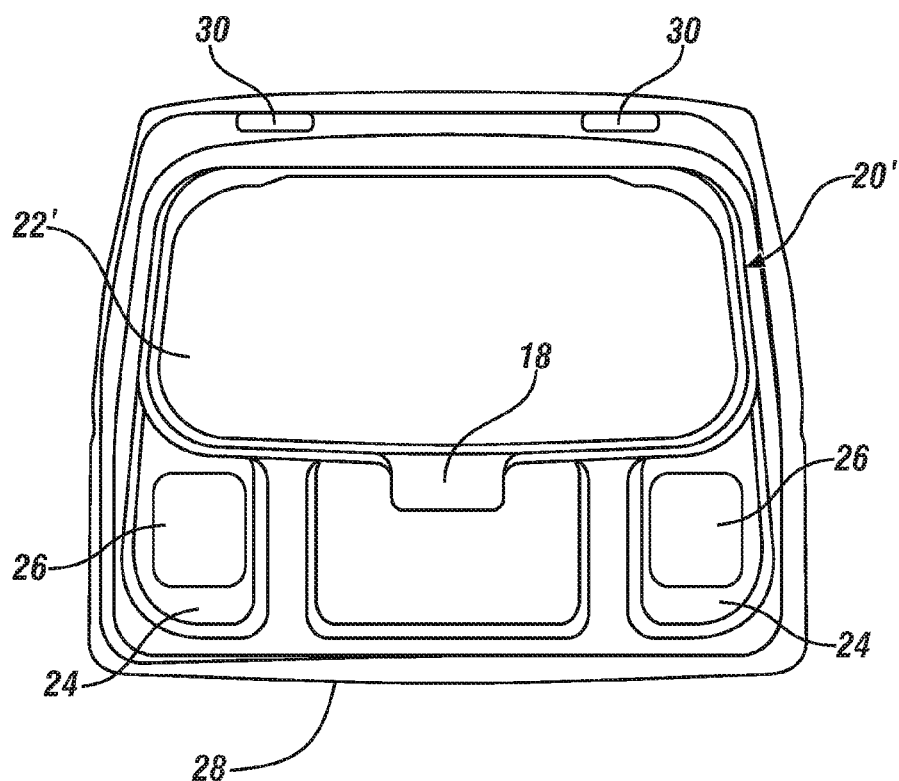
FIG. 3 shows, in plan view, a finished liftgate, corresponding to the liftgate formed in the metal blank of FIG. 2, after shearing to remove all excess metal from the blank periphery and punching to form interior openings.

FIG. 3 shows the finished article after shaped blank 16 of FIG. 2 has been trimmed to remove excess material and had holes 26 pierced both in depressions 24 to accommodate radio speakers, and at window opening elevation 22 to form window opening 22'.

This exemplary article if fabricated of magnesium, for example of a sheet AZ31 aluminum-zinc magnesium alloy, may, unless suitably protected, be subject to corrosion. In this example, galvanic corrosion may result at the hinge attachments. The hinges will typically be steel and may be attached using steel fasteners such as screws in the rain gutter formed between the liftgate and the vehicle body. In this location the magnesium-steel joint between the hinge 15 (FIG. 1) and its mounting location 30 would be exposed to rainwater and possibly to other electrolytes suitable for promoting corrosion. A similar environment may occur at handle mounting flat 18 if any rain or road splash should circumvent the seals and gain ingress to the handle mechanism-mounting flat region where at least steel fasteners will be in contact with magnesium inner panel 20'. The trimmed edges surrounding window opening 22' and speaker openings may also be susceptible to general or galvanic corrosion in the event of a seal breach enabling access of rain or road splash, or even in high humidity environments, particularly oceanside, high humidity environments. Also at least the lower edge 28 of inner panel 20', corresponding to lower edge 11 of liftgate 12 (FIG. 1) may experience exposure to wet or moist conditions arising from road splash or rain, and again may be subject to corrosion if inadequately protected.

Coatings are commonly used to protect corrodible materials. Such coatings may be sacrificial coatings which afford protection by corroding in preference to the protected metal, or barrier coatings which serve to deny the electrolyte access to the protected metal. Of course, for long-term protection, the barrier coating itself should be substantially corrosion-resistant in the anticipated use environment. Because of its highly corrodible nature, few materials corrode in preference to magnesium and a barrier coating is commonly used. For ease of application it is preferred to administer the coating to a flat, unformed magnesium sheet and form, by stamping or bending or similar methods, the sheet and its applied coating into a body component. During forming the coating will be stretched with the magnesium and so, to avoid breaching the coating by cracking or tearing, the coating should be at least as ductile as the magnesium sheet. Also the coating will be dragged, under pressure, across the die faces and should not flake or abrade and thereby compromise its ability to protect the magnesium. Finally, magnesium alloys may be warm formed at temperatures of around 300° C. For these reasons organic coatings with limited ability to stretch and which are prone to damage during such forming are less suitable and a ductile metallic coating, capable of deforming with the magnesium sheet and tolerant of die contact is preferred. One such suitably non-corrodible coating material is aluminum, which may be, for example, an unalloyed commercial purity aluminum such as an Aluminum Association 1xxx alloy, or a suitable aluminum alloy, typically an aluminum Association 5xxx series alloy with magnesium as its primary alloying element. Preferably the alloy selected for the coating should contain low concentrations of copper and iron. Specialty aluminum alloy AA1199, containing 99.99% by weight of magnesium and exceptionally low concentrations of iron and copper may be preferred.

One suitable approach for applying an aluminum coating to magnesium alloys in general and to AZ31 sheet alloys in particular is cold spray coating, a process in which heated, but solid, metal particles are accelerated to high speeds and impacted against a substrate. The impact is sufficient to adhere the particle to the substrate. Repeated many times, such a process will develop an adherent coating layer on the surface of the substrate of any desired thickness.

Suitable cold spray coating parameters for practice of the invention include: an inert, gas mixture of nitrogen or helium or nitrogen-helium mixtures at a pressure of between about 2.5 and 3.5 MPa; substantially pure aluminum, aluminum-zinc alloy, or aluminum-alumina powders or powder mixtures ranging in size from about 5 micrometers to about 20 micrometers and preheated to about 500° C. Because the sheet surface is extensive a nozzle suitable for depositing a coating with a width representative of the upper limits of the width range of the process, say between 6 and 12 millimeters wide, may be employed.

Cold spray coating is considered a 'cold' coating process which only briefly and minimally raises the substrate or target temperature, typically by between 200 and 300° C. for only a few seconds, depending somewhat on coating thickness. Preheated pressurized gas is forced through a nozzle. At the nozzle, the expansion of the gas converts enthalpy into kinetic energy, which accelerates the gas flow to supersonic speeds of up to about 1000 m/s (for pure helium at about room temperature or 20° C.) or up to about 350 m/s (for pure nitrogen at about room temperature) while reducing its temperature. The powder feedstock is introduced axially into the gas stream, prior to the nozzle throat to be accelerated by the gas. The accelerated solid particles impact the substrate with enough kinetic energy to induce mechanical and/or metallurgical bonding with the substrate. The use of the inert gases helium and nitrogen suppresses oxidation and leads to promote a roughened substantially metallic aluminum or aluminum alloy coating on the substrate surface. Continued exposure of the substrate to the particle flux will result in coatings of progressively increasing thickness. An average coating thickness of between at least about 40 micrometers and about 400 micrometers is suitable for practice of the invention.

To be effective, barrier coatings should entirely deny access of the electrolyte to the corrosive medium. Minor breaches in the coating which expose the corrodible material, here magnesium, to the electrolyte create a galvanic cell with a small anode area (magnesium) and a large cathode area (the coating) and promote very rapid corrosion of the magnesium at the site of the breach. An as-deposited cold spray coating commonly contains pores or cracks or other coating breaches and therefore does not convey the desired level of corrosion protection.

Figure 4:
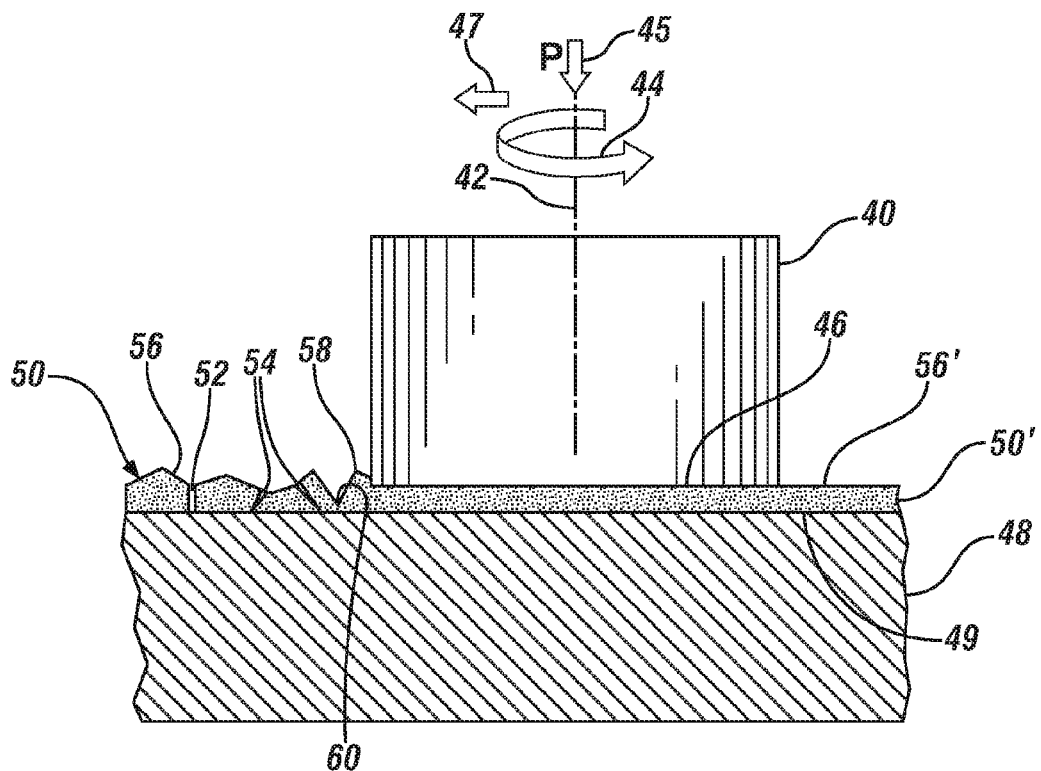
FIG. 4 depicts, in schematic sectional view, an as-deposited coating on a magnesium alloy sheet being worked and smoothed by an end surface of a cylindrical tool, rotating about its cylindrical axis.

To render a suitable degree of corrosion protection, the coating may be perfected by at least working and smoothing the coating to substantially eliminate the pores and cracks. More aggressive working of the coating which leads to increased frictional heating may promote, in addition to the smooth worked coating, some mixing or alloying of the coating with the magnesium substrate and provide superior bonding between the substrate and coating. Working may be accomplished using a tool fashioned into the form of a cylinder and fabricated of a suitably durable material, for example, hardened tool steel or carbide or ceramic. As shown in FIG. 4, cylindrical tool 40 rotating about its cylindrical axis 42 is oriented generally perpendicular to sheet surface 49 in a direction indicated by arrow 44 and is pressed, under a pressure P in a direction indicated by arrow 45 into surface coating 50 deposited on sheet 48. Surface coating 50 is characterized by a roughened surface 56 with pores 52 and cracks 54 which render it deficient for forming a protective barrier coating on sheet 48 to render sheet 48 less susceptible to corrosion if exposed to an aqueous electrolyte. The combination of the frictional heating of surface 56 of coating 50 and the applied pressure P acts to smooth and level coating 50 so that as tool 40 advances in the direction of arrow 47, a substantially smooth surface 56' is formed and pores 52 and cracks 54 are healed leaving behind a modified coating 50' which is essentially pore- and crack-free. More aggressive working of the surface, for example by some suitable combination of increase in the tool rotation speed, or slowing the traverse speed or increasing the applied pressure, may enable some portion of sheet surface 49 to mix and commingle with coating 50 as it is worked. Such an alloyed coating will confer enhanced corrosion protection relative to an uncoated magnesium alloy but some loss of protection, compared to an unalloyed aluminum or aluminum alloy coating will result although enhanced adhesion of the coating to the sheet may be expected.

With the configuration shown in FIG. 4, some of the coating may be displaced and pushed aside rather than be fed under the tool surface 46. For example consider the small nub of material 58 which may be sheared off and cast to one side by the advancing rotating tool. Such a loss of coating is undesirable because the cast-aside material is anticipated to fill any depressions in the coating. Any loss of coating material may cause any deep depressions in coating 50, for example at location 60, to pass under surface 46 of tool 40 and remain unfilled.

Figure 5:
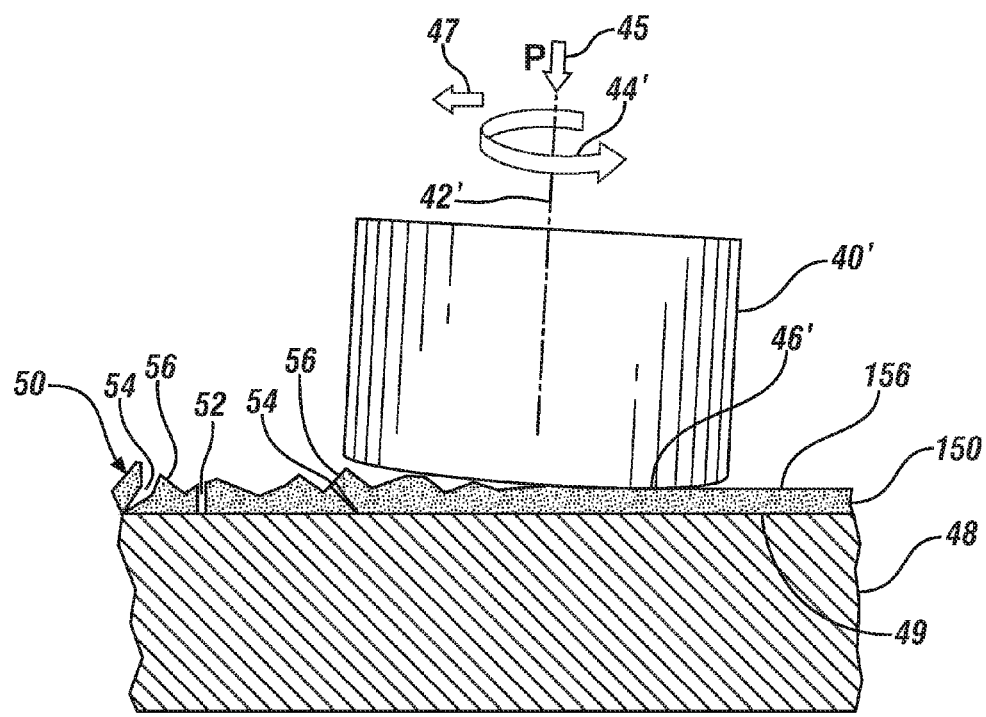
FIG. 5 depicts, in schematic sectional view, an as-deposited coating on a magnesium alloy sheet being worked and smoothed by a convex end surface of an inclined cylindrical tool rotating about its cylindrical axis.

To minimize loss of material and ensure better feed of surface material under the rotating surface of the tool, the coating-contacting surface 46' of the tool 40' may be shaped as convex rather than flat. Preferably a tool with a convex coating-contacting tool end 46' in FIG. 5, will be suitably tilted so that its cylindrical axis 42' is inclined to the normal to sheet surface 49 to maximize that portion of the tool coating-contacting surface 46' which is in contact with the coating at any instant. As in the embodiment of FIG. 4, the tool 40' is rotated about its cylindrical axis 42' in the direction of arrow 44' while advancing in the direction of arrow 47. Coating 50 on sheet 48, again contains pores 52 and cracks 54 which are filled as surface 56 is smoothed to produce an essentially pore- and crack-free coating 150 with substantially smooth surface 156.

The embodiments described above may be employed to coat the entirety of a sheet surface or both sheet surfaces as required. Such an extensive coating may be beneficial when general corrosion is of concern. In many sheet body components however galvanic corrosion resulting from contact of the magnesium sheet with a less-corrodible metal such as aluminum or steel in the presence of electrolyte is of greater concern. Galvanic corrosion may be effectively reduced by ensuring that only those magnesium sheet portions which are in contact with or in close proximity to the less corrodible metal are coated. Those portions, when coated, will most cost-effectively suppress galvanic corrosion without requiring that the entire sheet area be coated. Application of the coating to an undeformed sheet before stamping was previously justified by the relative ease of application of the coating to a flat sheet. But it will be appreciated that the need for smoothing the coating under the action of a forcefully applied tool provides further support for this approach. Because stamped articles are commonly compliant and readily distorted, the required mechanical working could potentially distort or damage the article.

Figure 6:
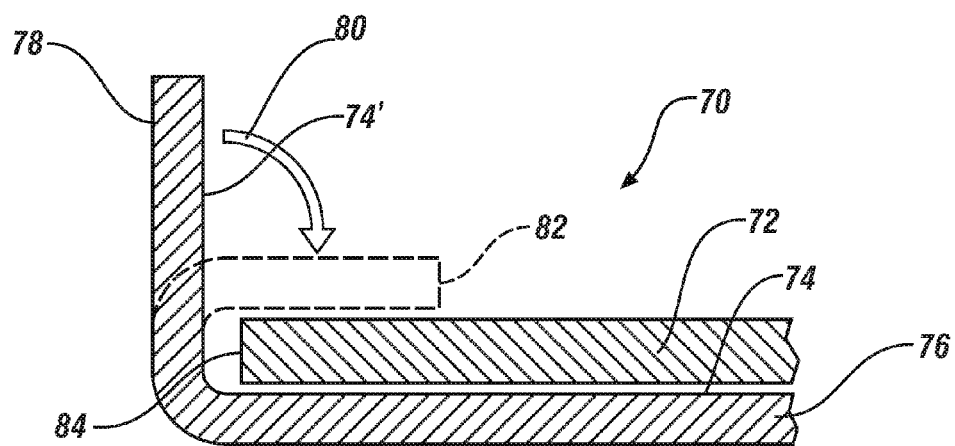
FIG. 6 shows, in schematic cross-section, a hem flange.

Most sheet metal stampings are trimmed, usually by shearing using mating dies, after forming. The shearing action will expose cold-worked magnesium edges and commonly also results in the formation of a burr, both features which promote corrosion. In many body assemblies, such as closure panels like doors, liftgates, decklids and hoods, a hem flange is used to secure one formed panel to another. In a hem flange 70, as shown in FIG. 6, a generally flat or undeformed sheet edge portion 72 of a first sheet is placed on an interior surface 74 of second sheet 76. Generally sheet 76 has been pre-bent around its periphery to form an upstanding flange 78 so positioned as to closely accommodate the first sheet. When flange 78 is further bent over in the direction indicated by arrow 80 to form flange 82, sheet edge portion 72 of the first sheet is sandwiched between inner surfaces 74' and 74 of the flanged 82 and unflanged portions of sheet 86.

In the flanged configuration, sheet edge 84, which may correspond to article edge 28 of FIG. 3, is largely inaccessible to conventional corrosion-inhibiting treatments, such as paint, applied to the body. Since sheared edge 84 is made after application of the aluminum cold spray surface treatments applied to the sheet, any lack of paint or other barrier coating protection may result in corrosion initiating at the cut edge and propagating inward until it becomes visible. This type of corrosion may be promoted by the heavily cold worked condition of the cut edge and by any burr, a thin protruding ragged edge, which may be present. Both of these characteristics if present at sheared edge 84 may promote aggressive corrosive attack. There is therefore a need to enhance the corrosion protection afforded to the sheet by applying an aluminum-based coating to the cut edge similar to that applied to the initially flat sheet surfaces.

Figure 7:
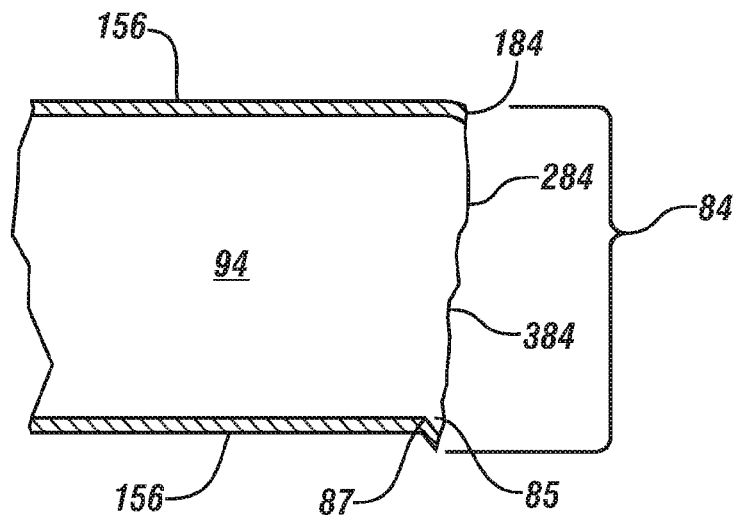
FIG. 7 shows, in cross-section, a schematic view through a portion of a magnesium sheet with a sheared edge.

It is preferred that any coating only be applied after first removing any burr from the sheared edge. A schematic illustration of a section through a portion of a sheet 94 coated on both surfaces with a ductile barrier coating 156 and illustrating a sheared edge with a burr is shown in FIG. 7. The downwardly extending burr 85 attached to face 84 of sheet 72 is not well attached to sheet 94 and may be knocked off, either during further processing or while in service. If the burrs should be knocked off after being coated with an alloy then the magnesium sheet would be exposed at the root 87 of the burr enabling access to electrolyte and promoting corrosion of the magnesium sheet. To forestall this possibility, the sheet edge may be treated to remove any burr prior to application of the ductile coating.

Figure 8:
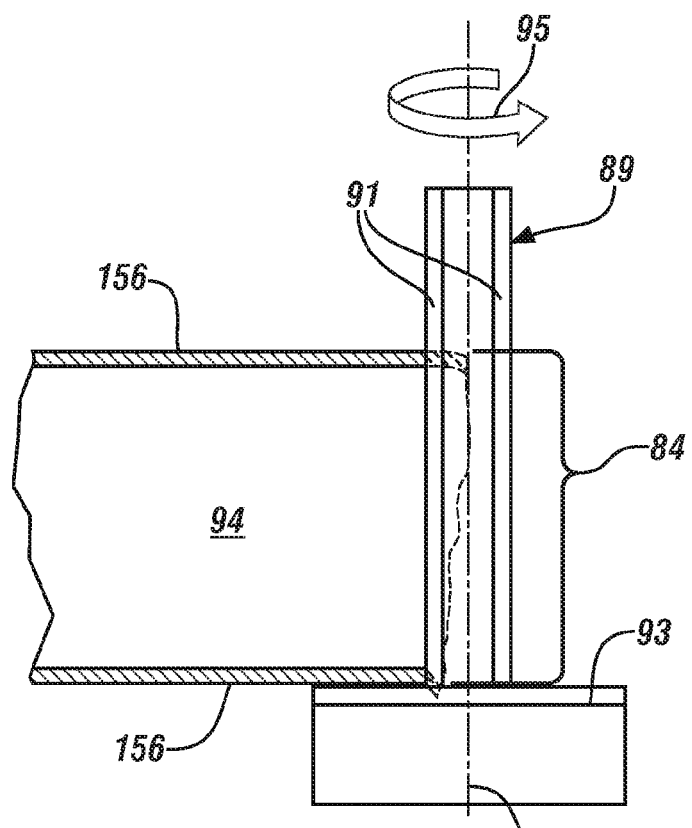
FIG. 8 shows, in cross-section, a schematic view of the interaction between one embodiment of a tool for reshaping a sheared edge on a magnesium sheet, such as that shown in FIG. 7 to render a burr-free squared edge.

Commonly, as shown in FIG. 7 a sheared edge is neither square, that is perpendicular to the sheet surface, nor smooth, and consists of a rolled-over section 184, a burnished section 284 and a roughened fractured section 384. For reasons detailed below it is also preferred to smooth the sheared edge and to render it square or perpendicular to the sheet surfaces. A tool suited for accomplishing both burr removal and edge smoothing/squaring is shown interacting with the sheared edge in FIG. 8. Tool 89, generally having the shape of an inverted letter 'T' and rotating about an axis 99 aligned with the vertical axis of the 'T' in a direction indicated by arrow 95 has a first set of cutting edges 91 oriented to engage sheared edge 84 and a second set of cutting edges 93 oriented to engage burr 85. Thus by advancing the edge of sheared sheet 72 into engagement with tool 89, cutting edges 91 will square sheared edge 84 and cutting edges 93 will remove burr 85. The tool may then be advanced around the perimeter of all sheared edges to create a square, burr-free cut edge. If it is preferred to burnish rather than cut the edge, the edge may be burnished by using a tool of similar geometry to that shown but without the cutting edges. The rubbing and heating produced by a burnishing tool is capable of re-shaping the edge to a desired configuration by flowing and relocating material. For example material may be displaced from those regions where there is an excess of material, like burnished section 284 and burr 85, to material-deficient regions like fracture section 384, to achieve the intended edge geometry. If aluminum or other appropriate powder may be fed into the gap between such a burnishing tool and the sheet edge, it may be possible to deposit and attach at least some aluminum on the sheet edge in conjunction with the edge reshaping resulting from the burnishing process.

Figure 9:
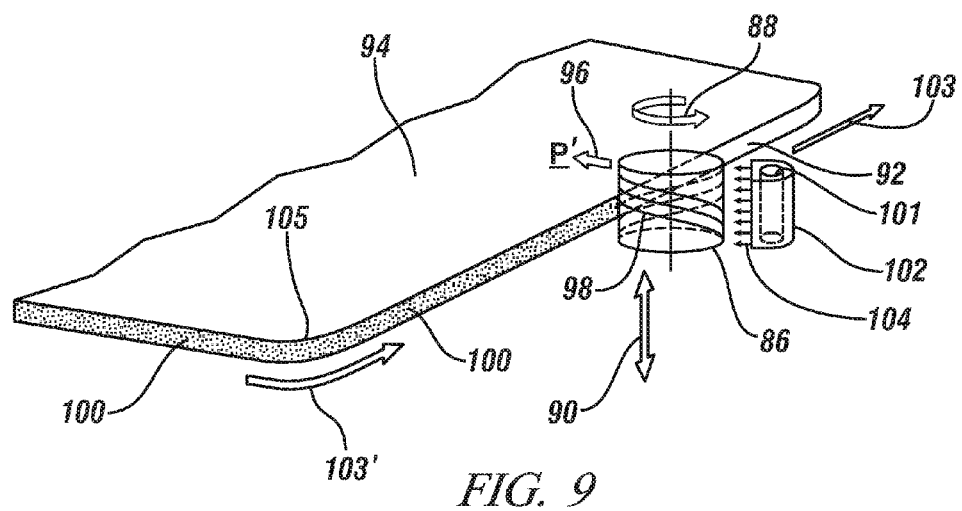
FIG. 9 depicts, in schematic perspective view, a method for applying a ductile metal deposit on the edge(s) of a magnesium alloy sheet section through transfer of material from a rotating cylinder of material in contact with the sheet edge.

The square, burr-free edge may also be coated using the cold spray approach described earlier. Such processing may be effective, but the cold spray process is not well-suited to applying aluminum to a thin, about 1 millimeter or so wide edge and significant overspray may be expected. A potentially more effective approach to applying a ductile metal coating to the square burr-free edge is illustrated in FIG. 9 which shows an aluminum alloy cylinder 86, rotating as indicated by arrow 88, while undergoing reciprocating vertical motion as indicated by arrow 90. It will be appreciated that the extent of the reciprocating vertical motion may not exceed the length of aluminum alloy cylinder 86. Cylinder 86 is in pressurized contact with square, burr-free edge 92 of magnesium sheet 94 under the application of load P' applied in the direction of arrow 96. As sheet edge 92 traces out helical path(s) 98 on the surface of the cylinder 86, material is transferred from cylinder 86 and deposited on sheet edge 92 as aluminum alloy coating 100. Traversing edge 92 of sheet 94 along the direction shown by arrow 103, enables coverage of the entire extent of edge 92 and by appropriately adjusting the traverse direction, for example as shown by arrow 103', at sheet corners, the entire edge of sheet 94 may be coated. It will be appreciated that angular sheet corners with abrupt changes in edge orientation, will challenge even deposition of the aluminum alloy coating. Thus it may be preferred to impart a plan view radius to the sheet corners, as shown, for example at corner 105. This may be done most straightforwardly by radiusing the corner in the shear die so that the sheared edge has the desired profile, but if this is not done, the path of cutter 89 may be programmed to achieve the desired radius.

Because pure magnesium and aluminum have similar melting points of about 650° C. and 660° C. respectively, it may be required to preheat the aluminum cylinder to ensure that aluminum will deposit on the magnesium sheet while suppressing any tendency of the magnesium to deposit on the aluminum cylinder. Any suitable heating arrangement may be used including resistance heating or laser heating employing a laser which tracks the motion of helical contact path 86. But a convenient approach is to use a linear infra red heat lamp 101 mounted at the focus of a parabolic reflector 102 to produce a parallel flux of heating radiation 104 directed at cylinder 86.

The rotational and reciprocating motions of cylinder 90 may be coordinated to assure generally uniform wear of the cylinder along its length. A non-reciprocating disc (not shown) with a thickness slightly greater than the thickness of sheet 94 and positioned to engage edge 92 may be used. But, over time such a disc will develop a groove, which may interfere with the aluminum deposition and require frequent replacement of the disc. Alternatively a non-reciprocating but adjustable aluminum alloy cylinder may be used and the cylinder repositioned to bring another portion of the cylinder into contact with edge 92 when any groove reaches an unacceptable depth.

Figure 10:
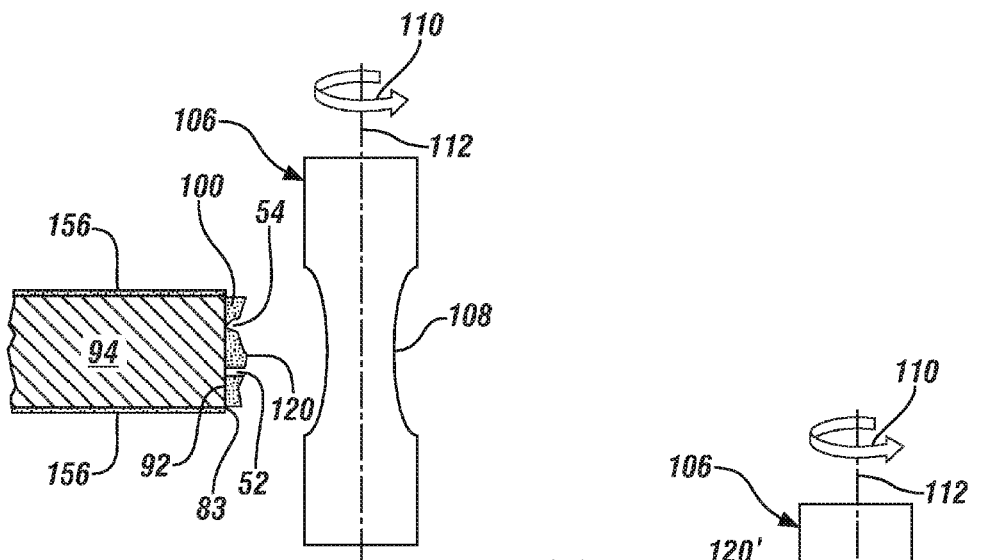
FIG. 10 shows in schematic sectional view, a section through a sheared edge of a magnesium alloy sheet with an as-deposited ductile metal applied by the method shown in FIG. 9.

Once deposited, aluminum alloy coating 100 may be worked and shaped using a rotating tool pressed against the coating in a manner similar to that described previously. A suitable tool is shown in FIG. 10. Tool 106 is a cylindrical tool with reduced, generally elliptical waist section 108 extending over a portion of the tool just greater in extent than the thickness of the sheet 94. Suitably the waist section may be between 110% and 160% of the sheet thickness. Sheet 94, in addition to aluminum alloy coating 100, applied by the method of FIG. 9, on squared edge 92 has previously applied and smoothed coating layers 156 on each of its surfaces. Coating 100 exhibits an irregular surface 120 and may incorporate flaws such as crack 54 pore 52 and a region of incomplete coverage at 83 which may permit electrolyte access to magnesium sheet 94. Coating 100 may be smoothed to spread and work the coating over the entire cut edge surface and be rendered essentially crack- and pore-free by bringing tool 106, rotating about its cylindrical axis 112 in a direction shown by arrow 110 into contact with coating 100 while applying pressure to smooth and work the coating.

Figure 11:
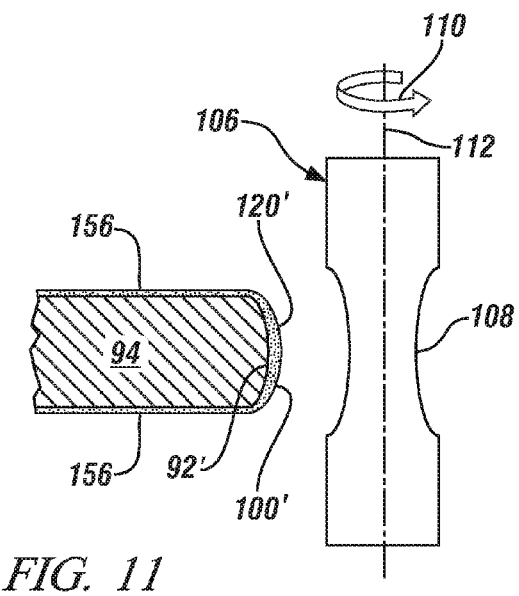
FIG. 11 shows, in schematic sectional view, a section through the sheared edge of the magnesium sheet shown in FIG. 10 after being worked and shaped.

The results of such a procedure are shown in FIG. 11 in which worked coating 100' has been smoothed to form contoured surface 120' complementary to the shape of reduced tool section 108. Worked coating 100' substantially completely covers cut edge 92, including previously uncoated region 83 (FIG. 10) while healing crack 54 and pore 52 (FIG. 10). The pressure applied by tool 106, may, because of the similarity in strength between aluminum and magnesium also be effective in reshaping originally square edge 92 (FIG. 10) to a shaped edge 92'.

The above invention has been described as it might be applied to a stamped sheet metal magnesium article but the invention may be broadly applied to any magnesium article including those fabricated by casting, forging and machining and any combination of these. When the invention is applied to the more robust magnesium articles commonly fabricated by these processes better able to accept the coating smoothing loads without damage, a corrosion coating may be applied after an article has been processed to final shape, and, possibly slightly undersize to accommodate the coating thickness.

Thus a suitably fixtured article may be exposed to a cold spray nozzle and either the article or the nozzle, or both, suitably articulated and controlled to apply a ductile metal coating of suitable thickness on whatever areas of the article are to be protected. The coating may then be smoothed using a rotating cylindrical tool similar to that shown at 40' in FIG. 5. Again it may be required to articulate the tool and/or article to enable access to all coated areas. Articulation may be enabled by mounting the tool, or nozzle in the coating step on a programmable robotic arm but dedicated automation may also be employed.

If complete coverage is required, or if the fixturing unreasonably limits spray or tool access, the article may be removed, possibly more than once, from its fixture and either relocated within the fixture or mounted in a second fixture to enable appropriate access to the article surface.

The invention has been described with respect to aluminum or aluminum alloy coatings on a magnesium alloy sheet but the practice of the invention is also applicable to other sheet materials, for example steels, and to other ductile metal coatings, for example zinc.

The invention claimed is:

1. A method of fabricating a corrosion resistant, magnesium-base alloy article expected to be exposed to a corrosive medium in the use of the article, the method comprising the steps of:
   forming, on at least a surface of the magnesium article, a substantially crack-free and pore-free ductile metal coating suitable for preventing access of an electrolyte to the magnesium alloy article and thereby enhancing the corrosion-resistance of the magnesium alloy article, the coating being formed by:
   spray coating particles of a ductile metal to form a layer of predetermined thickness of the ductile metal on at least a portion of a surface of the magnesium alloy article; and
   mechanically working and smoothing the ductile metal layer with a rotating tool applied to the ductile metal layer under pressure to form a substantially crack- and pore-free ductile metal coating.

2. The method of fabricating a corrosion resistant magnesium-base alloy article as recited in claim 1 in which the ductile metal layer has an average thickness ranging from about 40 micrometers to about 400 micrometers.

3. The method of fabricating a corrosion resistant magnesium alloy article as recited in claim 1 in which the ductile metal is preponderantly aluminum or preponderantly zinc.

4. A method of fabricating a corrosion resistant, stamped, sheet magnesium-based alloy article expected to be exposed to a corrosive medium in the use of the article, comprising the steps of:
   forming, on at least a surface of a magnesium-based alloy sheet, a substantially crack- and pore-free ductile metal coating suitable for preventing access of an electrolyte to the magnesium alloy sheet and thereby enhancing the corrosion-resistance of the magnesium sheet, by:

depositing a layer of a ductile metal on at least a portion of a surface of the magnesium alloy sheet; and mechanically working and smoothing the deposited ductile metal with a rotating tool applied to the deposited metal under pressure to form a substantially crack- and pore-free ductile metal coating; then, stamping the coated magnesium sheet to form, in the magnesium sheet, a desired shape;

trimming the shaped magnesium sheet to form an article, the article having at least one sheared edge; followed by, forming, on the edge of the article, a substantially crack- and pore-free ductile metal coating suitable for preventing access of an electrolyte to at least some portion of the alloy sheet edge and thereby enhancing the corrosion-resistance of the magnesium sheet edge by:

depositing a coating of the ductile metal on the portion of the sheet edge;

contacting, under pressure, a location on the coated portion of the sheet edge with a durable rotating tool to work and smooth the ductile metal coating to render it substantially crack- and pore-free; and advancing the tool around the coated edge portion of the article until the tool has worked and smoothed all of the coating.

5. The method of fabricating a corrosion resistant, stamped, sheet magnesium article as recited in claim 4 in which the layer of predetermined average thickness of a ductile metal is deposited by cold metal spraying.

6. The method of fabricating a corrosion resistant, stamped, sheet magnesium article as recited in claim 4 in which the ductile metal deposited on the portion of the sheet edge is deposited by cold metal spraying.

7. The method of fabricating a corrosion resistant, stamped, sheet magnesium article as recited in claim 4 further comprising shaping the sheared edge.

8. The method of fabricating a corrosion resistant, stamped, sheet magnesium article as recited in claim 7 in which the coating of the ductile metal on the sheet edge is deposited by contacting, under pressure, the sheet edge with the cylindrical surface of a cylinder of ductile metal, rotating about its cylindrical axis, to transfer and deposit some of the ductile metal on the sheet edge while moving the cylinder of ductile metal along the sheet edge.

9. The method of fabricating a corrosion resistant, stamped, sheet magnesium article as recited in claim 4 in which the ductile metal is preponderantly aluminum or preponderantly zinc.

10. The method of fabricating a corrosion resistant, stamped, sheet magnesium article as recited in claim 4 in which the ductile metal deposited on the surface of the sheet has a predetermined average thickness.

11. A method of forming, on at least a surface of a magnesium alloy sheet expected to be exposed to a corrosive medium in the use of the article, a substantially crack- and pore-free ductile metal coating suitable for preventing access of an electrolyte to the magnesium alloy sheet and thereby enhancing the corrosion-resistance of the magnesium sheet, the method comprising:

depositing a layer of predetermined average thickness of a ductile metal on at least a portion of a surface of the magnesium alloy sheet; and mechanically working and smoothing the deposited ductile metal with a rotating tool applied to the deposited metal under pressure to form a substantially crack- and pore-free ductile metal coating of substantially uniform thickness.

12. The method of forming the substantially crack- and pore-free ductile metal coating of claim 11 in which the ductile metal coating is one of the group consisting of unalloyed aluminum, aluminum alloy AA 1199, and an AA5xxx aluminum alloy.

13. The method of forming the substantially crack- and pore-free ductile metal coating of claim 11 in which the ductile metal coating is deposited, using a cold spray coating process, as a layer whose average thickness ranges from about 40 micrometers to about 400 micrometers.

14. The method of forming the substantially crack- and pore-free ductile metal coating of claim 13 in which the ductile metal coating is deposited using a cold spray coating process using an inert gas, the inert gas comprising at least one of nitrogen, argon and helium.

15. A method of forming, on the edge of a sheared magnesium alloy sheet a substantially crack- and pore-free ductile metal coating suitable for preventing access of an electrolyte to the magnesium alloy sheet edge and thereby enhancing the corrosion-resistance of the magnesium sheet edge, the method comprising:

shaping at least a length of the sheared magnesium alloy sheet edge to render a burr-free and substantially square edge;

contacting, under pressure, the square sheet edge length with the cylindrical surface of a cylinder of ductile metal, rotating about its cylindrical axis, to transfer and deposit some of the ductile metal on the square sheet edge while moving the rotating cylinder of ductile metal around the length of the square sheet edge;

contacting, under pressure, a location on the length of square sheet edge having the deposit of ductile metal with a durable rotating tool to work and smooth the ductile metal to render it substantially crack- and pore-free; and moving the tool around the length of the square sheet edge on which ductile metal was deposited.

16. The method of forming, on the edge of a sheared magnesium sheet the substantially crack- and pore-free ductile metal coating of claim 15, the method further comprising heating the cylinder of ductile metal.

17. The method of forming, on the edge of a sheared magnesium sheet the substantially crack- and pore-free ductile metal coating of claim 15, in which the ductile metal cylinder has a length, the method further comprising applying to the ductile metal cylinder a reciprocating motion along its cylinder axis.

* * * * *